United States Patent
Jette (10) Patent No.: US 11,205,890 B2
(45) Date of Patent: Dec. 21, 2021

(54) CABLE MANAGEMENT SYSTEM

(71) Applicant: Cable Management Solutions Inc., Bayshore, NY (US)

(72) Inventor: Roger Jette, East Islip, NY (US)

(73) Assignee: CABLE MANAGEMENT SOLUTIONS INC., Bayshore, NY (US)

( * ) Notice: Subject to any disclaimer, the term of this patent is extended or adjusted under 35 U.S.C. 154(b) by 0 days.

(21) Appl. No.: 16/858,192

(22) Filed: Apr. 24, 2020

(65) Prior Publication Data
US 2021/0336430 A1    Oct. 28, 2021

(51) Int. Cl.
*H02G 3/00* (2006.01)
*H02G 3/04* (2006.01)

(52) U.S. Cl.
CPC .......... *H02G 3/263* (2013.01); *H02G 3/0437* (2013.01); *H02G 3/0456* (2013.01)

(58) Field of Classification Search
None
See application file for complete search history.

(56) References Cited

U.S. PATENT DOCUMENTS

| | | | | |
|---|---|---|---|---|
| 3,007,708 A * | 11/1961 | Ochs | ........................ | B62B 3/002 |
| | | | | 280/33.998 |
| 4,978,013 A * | 12/1990 | Hogg | ........................ | A47F 5/13 |
| | | | | 211/132.1 |
| 5,052,474 A * | 10/1991 | Bronnert | ................. | F28F 9/013 |
| | | | | 165/67 |
| 5,893,539 A * | 4/1999 | Tran | ..................... | H02G 3/0443 |
| | | | | 248/68.1 |
| 5,913,787 A * | 6/1999 | Edwards | ................. | H02G 3/18 |
| | | | | 52/220.7 |

(Continued)

FOREIGN PATENT DOCUMENTS

| | | |
|---|---|---|
| EP | 1746697 A1 | 1/2007 |
| EP | 2924834 A2 | 9/2015 |

(Continued)

OTHER PUBLICATIONS

European Search Report issued in corresponding EP Application No. 21168008.7, dated Sep. 7, 2021, pp. 1-8.

*Primary Examiner* — Steven M Marsh
(74) *Attorney, Agent, or Firm* — Carter, DeLuca & Farrell LLP (57) ABSTRACT

A cable support apparatus includes first and second horizontal supports spaced-apart and substantially parallel to one another, a plurality of vertical supports spaced-apart horizontally along the first and second horizontal supports, and at least one junction box assembly configured to hang from the first horizontal support. Each horizontal support is formed from wire stock. Each vertical support is formed from wire stock and secured to each of the first and second horizontal supports. At least two of the vertical supports include cable-receiving segments that cooperate to define at least one cable-receiving channel extending horizontally. The at least one junction box assembly includes an input and an output for receiving cable ends of cables disposed within one of the at least one cable-receiving channels to enable joining of the cable ends within the junction box assembly.

14 Claims, 4 Drawing Sheets

(56) References Cited

U.S. PATENT DOCUMENTS

| | | | | |
|---|---|---|---|---|
| 6,926,236 B2 * | 8/2005 | Jette | ............... | H02G 3/0443 |
| | | | | 248/65 |
| 7,285,722 B2 * | 10/2007 | Shyr | ............... | F16B 5/0291 |
| | | | | 174/481 |
| 7,497,405 B2 * | 3/2009 | Huo | ............... | F16L 3/02 |
| | | | | 248/175 |
| 8,985,530 B2 * | 3/2015 | Jette | ............... | H02G 3/0443 |
| | | | | 248/67.7 |
| 2010/0059250 A1 | 3/2010 | Letourneur et al. | | |
| 2015/0255971 A1 | 9/2015 | Dean et al. | | |

FOREIGN PATENT DOCUMENTS

| | | |
|---|---|---|
| JP | 2005312215 A | 11/2005 |
| JP | 2009077522 A | 4/2009 |

\* cited by examiner

CABLE MANAGEMENT SYSTEM

BACKGROUND

Technical Field

The present disclosure relates to cable management and, more particularly, to cable management systems for carrying cables (e.g., electrical cables), conduits, or other elongated structures to be conveyed.

Description of Related Art

Due to the increasing usage of power, communication, data, and other cable-dependent systems, greater numbers of cables are required to interconnect various systems with one another and with various peripheral devices. As a result, cable management systems have been developed to deal with the task of organizing and routing cables to their destinations, sometimes across long distances. As can be appreciated, these cable management systems must be capable of securely retaining one or more cables and routing the cables to their destinations.

SUMMARY

To the extent consistent, any of the aspects detailed herein may be used in conjunction with any or all of the other aspects detailed herein.

A cable support apparatus provided in accordance with aspects of the present disclosure includes first and second horizontal supports spaced-apart and substantially parallel to one another, a plurality of vertical supports spaced-apart horizontally along the first and second horizontal supports, and at least one junction box assembly configured to hang from the first horizontal support. Each horizontal support is formed from wire stock and each vertical support is formed from wire stock. Each vertical support is secured to each of the first and second horizontal supports. At least two of the vertical supports include cable-receiving segments that cooperate to define at least one cable-receiving channel extending horizontally. The at least one junction box assembly includes an input and an output for receiving cable ends of cables disposed within one of the at least one cable-receiving channels to enable joining of the cable ends within the junction box assembly.

In an aspect of the present disclosure, the vertical supports are secured to the first and second horizontal supports via welding.

In another aspect of the present disclosure, the cable-receiving segments of the at least two of the vertical supports define rectangular-shaped cable-receiving areas extending perpendicularly relative to a plane containing the first and second horizontal supports.

In yet another aspect of the present disclosure, a plurality of cable-receiving channels extend horizontally, vertically offset relative to one another.

In still another aspect of the present disclosure, at least two of the vertical supports further include cable-grasping segments configured to defining a cable-grasping channel extending horizontally.

In still yet another aspect of the present disclosure, each of the vertical supports cooperates with each of the first and second horizontal supports to define first and second enclosed openings that enabling mounting of the cable support apparatus.

In another aspect of the present disclosure, at least one of the vertical supports defines a coupling arrangement configured to releasably secure a modular attachment thereto. The modular attachment may be a conduit support including an enclosed ring.

In another aspect of the present disclosure, at least two of the vertical supports are different from one another. In aspects, at least three vertical supports are different from one another.

In still another aspect of the present disclosure, a first plurality of the vertical supports and a second plurality of the vertical supports are different from one another. In such aspects, the first plurality of the vertical supports may include first cable-receiving segments that cooperate to define a first cable-receiving channel and the second plurality of the vertical supports may include second cable-receiving segments that cooperate to define a second cable-receiving channel vertically offset from the first cable-receiving channel.

In yet another aspect of the present disclosure, a third plurality of the vertical supports different from the first and second pluralities are provided. In such aspects, the third plurality of the vertical supports include third cable-receiving segments that cooperate to define a third cable-receiving channel vertically offset from the first and second cable-receiving channels.

In still yet another aspect of the present disclosure, the junction box assembly includes a plate configured to hang from the first horizontal support, a housing supported by the plate (wherein the input and the output are provided to the housing), and a hinged door selectively providing access to an interior of the housing.

In another aspect of the present disclosure, the junction box assembly further includes additional inputs and/or outputs, e.g., a second input.

BRIEF DESCRIPTION OF THE DRAWINGS

Various aspects and features of the present disclosure are described herein with reference to the drawings, wherein like reference numerals identify similar or identical elements.

DETAILED DESCRIPTION

Figure 1:
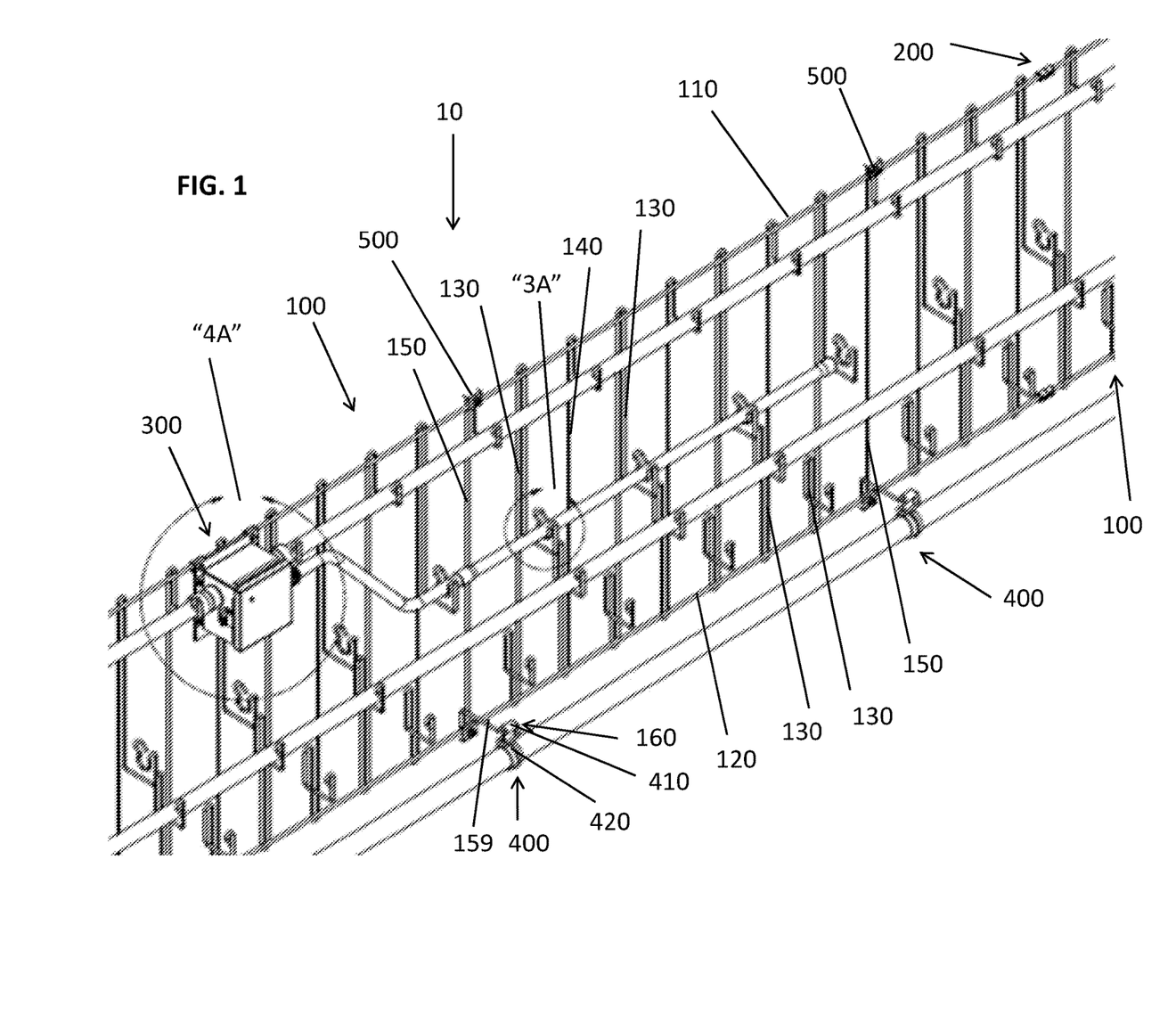
FIG. 1 is a perspective view of a cable support system provided in accordance with the present disclosure.

Turning now to FIG. 1, a cable support system provided in accordance with the present disclosure is shown generally identified by reference numeral 10. Cable support system 10 includes one or more cable support apparatuses 100 coupled to one another in end-to-end fashion, e.g., via upper and lower coupling sleeves 200, and one or more attachments modularly coupled with the one or more cable support apparatuses 100. The one or more attachments may include, for example, one or more junction box assemblies 300, one or more conduit supports 400, and/or any other suitable modular attachments. Cable support system 10 and the cable support apparatus(es) 100 thereof may be configured to carry cables, cable-carrying conduits, other conduits, pipes, or any other suitable elongated structures that require conveyance over distances.

The one or more cable support apparatuses 100 of cable support system 10 are identical to one another (not withstanding the type, number, and position of modular attachments connected thereto) and, thus, although cable support apparatus 100 may be detailed hereinbelow in the singular, it is understood that the corresponding description may apply to each cable support apparatus 100 of cable support system 10. Alternatively, different cable support apparatuses 100 may be formed and coupled to one another to define a custom configuration.

Cable support apparatus 100 is configured for positioning against a generally vertically-oriented surface, which may be continuous, e.g., defined by a wall, or discontinuous, e.g., defined by a plurality of spaced-apart vertical support pillars. The generally vertically-oriented surface may be substantially planar, e.g., similar to a building surface or wall, or may define a curvature, e.g., similar to an interior surface of a tunnel. Cable support apparatus 100 includes an upper horizontal support 110 formed from a piece of wire stock and a lower horizontal support 120 formed from a piece of wire stock. The upper and lower horizontal supports 110, 120, respectively, extend in generally parallel orientation relative to one another in vertically-spaced relation relative to one another. Terms like "generally," "about," and "substantially" as utilized herein are meant to encompass variations up to and including plus or minus 10 degrees or 10 percent.

The upper and lower horizontal supports 110, 120, being formed from wire stock, are malleable yet sufficiently rigid to hold their shape. That is, in order to form a cable support apparatus 100 to a desired configuration, the installer(s) need only grasp the upper and lower horizontal supports 110, 120 on opposing sides of the desired bend point and manipulate the upper and lower horizontal supports 110, 120 to a desired configuration, with cable support apparatus 100 thereafter retaining its formed configuration. The above process can then be repeated at each desired bend point such that each cable support apparatus 100 achieves a desired configuration.

Cable support apparatus 100 further includes first, second, and third vertical supports 130, 140, 150 disposed in spaced-apart relation horizontally along the upper and lower horizontal supports 110, 120. It is contemplated that any suitable patterns and/or arrangements (including non-patterned arrangements) of first, second, and/or third vertical supports 130, 140, 150 and/or different vertical supports be provided. By way of example only, and as illustrated in FIG. 1, vertical supports 130, 140, 150 are arranged to define a pattern wherein plural pairs, e.g., three, of alternating first and second vertical supports 130, 140 are provided, followed by an additional first vertical support 130, followed by a third vertical support 150 before the pattern is repeated. Each of the vertical supports 130, 140, 150 is formed from a piece of wire stock and is secured, e.g., welded, to each of the upper and lower horizontal supports 110, 120. Each of the vertical supports 130, 140, 150 are described in detail, in turn, below.

Figure 2:
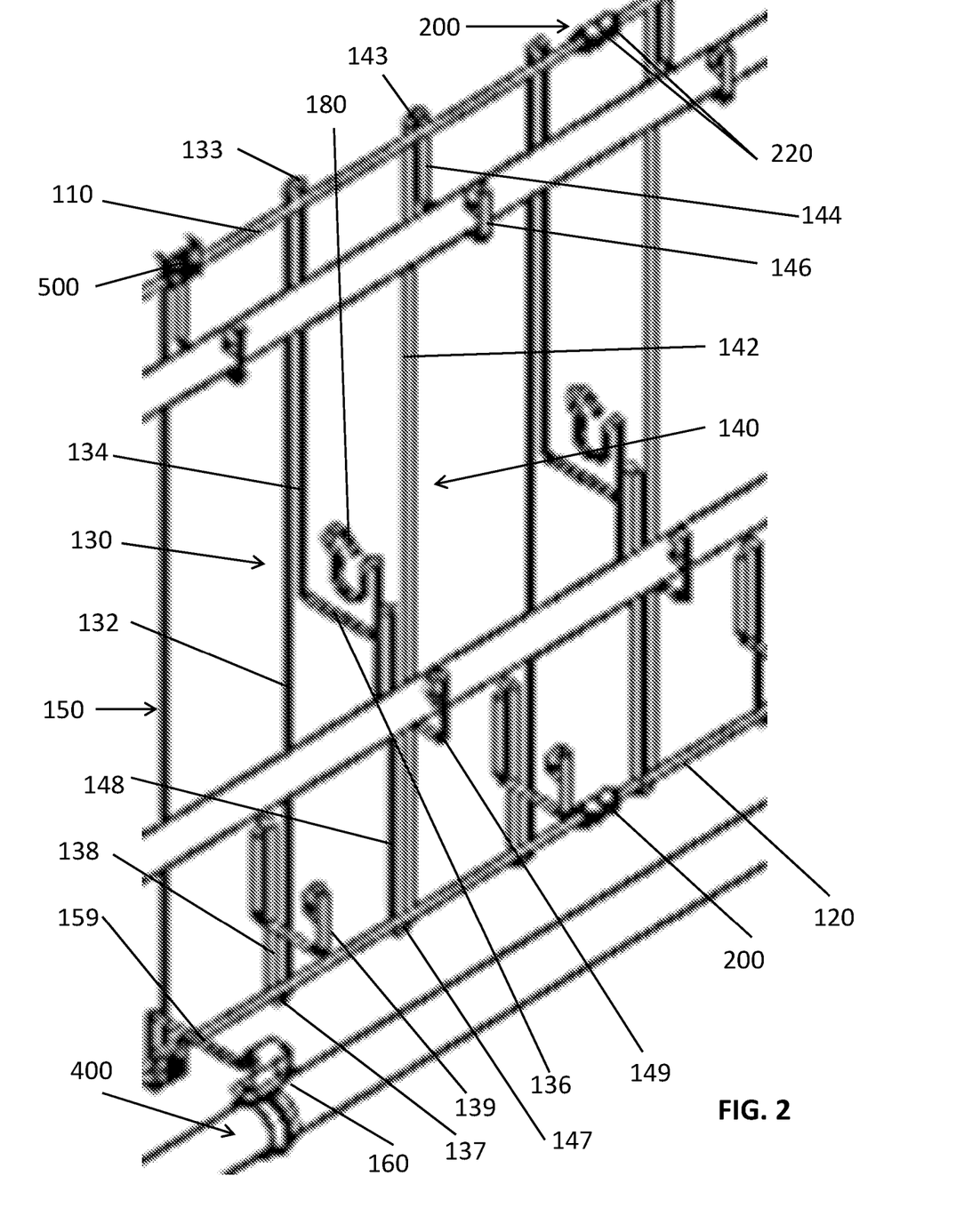
FIG. 2 is an enlarged view of a portion of the cable support system of FIG. 1.

Referring to FIGS. 1 and 2, each first vertical support 130 includes a first segment 132 extending vertically above upper horizontal support 110 and below lower horizontal support 120. First segment 132 is welded or otherwise secured to upper and lower horizontal supports 110, 120 at the intersection points therewith. A second segment 134 of each first vertical support 130 extends from above upper horizontal support 110 in generally parallel, spaced-apart relation relative to first segment 132 to a position disposed between upper and lower horizontal supports 110, 120, e.g., a mid-point, closer to upper horizontal support 110, or closer to lower horizontal support 120. Second segment 134 is welded or otherwise secured to upper horizontal support 110 at the intersection point therewith. A looped segment 133 interconnects first and second segments 132, 134 above upper horizontal support 110 to define an enclosed opening surrounded by first segment 132, looped segment 133, second segment 134, and upper horizontal support 110. A third segment 136 extends from second segment 134 at the position disposed between upper and lower horizontal supports 110, 120. Third segment 136 is detailed below with reference to FIGS. 3A and 3B.

A fourth segment 138 of each first vertical support 130 extends from below lower horizontal support 120 in generally parallel, spaced-apart relation relative to first segment 132 to a position disposed between upper and lower horizontal supports 110, 120, e.g., a mid-point, closer to upper horizontal support 110, or closer to lower horizontal support 120. Fourth segment 138 is welded or otherwise secured to lower horizontal support 120 at the intersection point therewith. A looped segment 137 interconnects first and fourth segments 132, 138 below lower horizontal support 120 to define an enclosed opening surrounded by first segment 132, looped segment 137, fourth segment 138, and lower horizontal support 120. A fifth segment 139 extends from fourth segment 138 at the position disposed between upper and lower horizontal supports 110, 120.

Fifth segment 139 protrudes perpendicularly from a plane containing upper and lower horizontal supports 110, 120 and defines a partial rectangle configuration including first and second sides interconnected by a bottom. In this manner, fifth segment 139 defines a generally rectangular cable receiving area. The fifth segments 139 of the first vertical supports 130 are horizontally aligned with one another such that they cooperate to define a horizontally-extending a cable-receiving channel extending along cable support apparatus 100. The free end of each fifth segment 139 is turned back on itself to avoid sharp ends and snag points protruding from cable support apparatus 100.

The enclosed openings defined adjacent upper and lower horizontal supports 110, 120 in conjunction with each first vertical support 130 are oriented perpendicularly relative to a plane containing upper and lower horizontal supports 110, 120, thus enabling screws, bolts, nails, and/or other supports to be inserted therethrough to mount cable support apparatus 100 to a generally vertically-oriented surface and/or to mount one or more modular attachments to cable support apparatus 100.

Continuing with reference to FIGS. 1 and 2, each second vertical support 140 includes a first segment 142 extending vertically above upper horizontal support 110 and below lower horizontal support 120. First segment 142 is welded or otherwise secured to upper and lower horizontal supports 110, 120 at the intersection points therewith. A second segment 144 of each second vertical support 140 extends from above upper horizontal support 110 in generally parallel, spaced-apart relation relative to first segment 142 to a position disposed between upper and lower horizontal supports 110, 120, e.g., a mid-point, closer to upper horizontal support 110, or closer to lower horizontal support 120. Second segment 144 is welded or otherwise secured to upper horizontal support 110 at the intersection point therewith. A looped segment 143 interconnects first and second segments 142, 144 above upper horizontal support 110 to define an enclosed opening surrounded by first segment 142, looped segment 143, second segment 144, and upper horizontal support 110. A third segment 146 extends from second segment 144 at the position disposed between upper and lower horizontal supports 110, 120.

Third segment 146 protrudes perpendicularly from a plane containing upper and lower horizontal supports 110, 120 and defines a partial rectangle configuration including first and second sides interconnected by a bottom, similarly as with fifth segment 139 of first vertical support 130, although different dimensions of the cable receiving area may be provided. The third segments 146 of the second vertical supports 140 are horizontally aligned with one another such that they cooperate to define a horizontally-extending a cable-receiving channel extending along cable support apparatus 100. This cable-receiving channel is vertically offset from the cable-receiving channel defined by fifth segments 139 of first vertical supports 130 such that the cable-receiving channels do not intersect or otherwise interfere with one another.

A fourth segment 148 of each second vertical support 140 extends from below lower horizontal support 120 in generally parallel, spaced-apart relation relative to first segment 142 to a position disposed between upper and lower horizontal supports 110, 120, e.g., a mid-point, closer to upper horizontal support 110, or closer to lower horizontal support 120. Fourth segment 148 is welded or otherwise secured to lower horizontal support 120 at the intersection point therewith. A looped segment 147 interconnects first and fourth segments 142, 148 below lower horizontal support 120 to define an enclosed opening surrounded by first segment 142, looped segment 147, fourth segment 148, and lower horizontal support 120. A fifth segment 149 extends from fourth segment 148 at the position disposed between upper and lower horizontal supports 110, 120.

Fifth segment 149 of second vertical support 140 is similar to fifth segment 139 of first vertical support 130 and is vertically-offset relative thereto and relative to the third segment 146 such that the cable-receiving channel defined by the plural fifth segments 149 do not intersect or otherwise interfere with the other cable-receiving channels.

The enclosed openings defined adjacent upper and lower horizontal supports 110, 120 in conjunction with each second vertical support 140, similarly as with those of the first vertical supports 130, enable mounting of cable support apparatus 100 to a generally vertically-oriented surface and/or to mounting of one or more modular attachments to cable support apparatus 100.

As illustrated in FIGS. 1 and 2, third vertical support 150 is similar to second vertical support except for the configuration of fifth segment 159 thereof. Thus, for purposes of brevity, only fifth segment 159 of third vertical support is detailed.

Fifth segment 159 of third vertical support 150 includes a linear portion that extends in perpendicular orientation from a plane containing upper and lower horizontal supports 110, 120 to a coupling arrangement 160 configured to releasably secure a modular attachment thereto, e.g., a conduit support 400. Coupling arrangement 160 is defined by bending the wire stock to define a vertically-oriented opening for receipt of a base 410 of the conduit support 400 to suspend the conduit support 400 from the coupling arrangement 160. A ring 420 of the conduit support 400 is thus suspended therefrom. Plural conduit supports 400 may be attached to the coupling arrangements 160 of the third vertical supports 150 to define a conduit support path extending horizontally. In this manner, a conduit, e.g., an electrical wire conduit, pipe, etc., or loose electrical cables (not shown), may be supported by the conduit supports 400 and extend horizontally through the conduit support path.

Enclosed apertures defined by third vertical support 150 are illustrated including mounting hardware 500 engaged therewith, e.g., to mount cable support apparatus 100 to a generally vertically-oriented surface and/or to mount one or more modular attachments to cable support apparatus 100. These enclosed apertures and/or the enclosed apertures of first and second vertical supports 150 may be utilized.

As noted above, upper and lower coupling sleeves 200 may be utilized to couple multiple cable support apparatuses 100 to one another in end-to-end fashion. Each coupling sleeve 200 is configured for securing ends of adjacent pairs of upper horizontal supports 110 or lower horizontal support 120, such that two coupling sleeve 200 are utilized to coupled a pair of cable support apparatuses 100 to one another. Each coupling sleeve 200 defines a tube-like configuration including a lumen extending therethrough. A pair of tightening screws 220 is engaged within coupling sleeve 200 and extend into the lumen. Tightening screws 220 may be advanced (or retracted) relative to the lumen to extend further therein to or retract further therefrom. In order to couple first and second cable support apparatuses 100 to one another, a first end of the upper horizontal support 110 of the first cable support apparatus 100 is inserted into a first end of the lumen of coupling sleeve 200, while a second end of the upper horizontal support 110 of the second cable support apparatus 100 is inserted into a second end of the lumen of coupling sleeve 200. Thereafter, tightening screws 220 are tightened to securely engage the ends of the upper horizontal supports 110 of the first and second cable support apparatuses 100 to one another via coupling sleeve 200. This is then repeated using another coupling sleeve 200 at the lower horizontal supports 120 of the first and second cable support apparatuses 100.

Figures 3A, 3B:
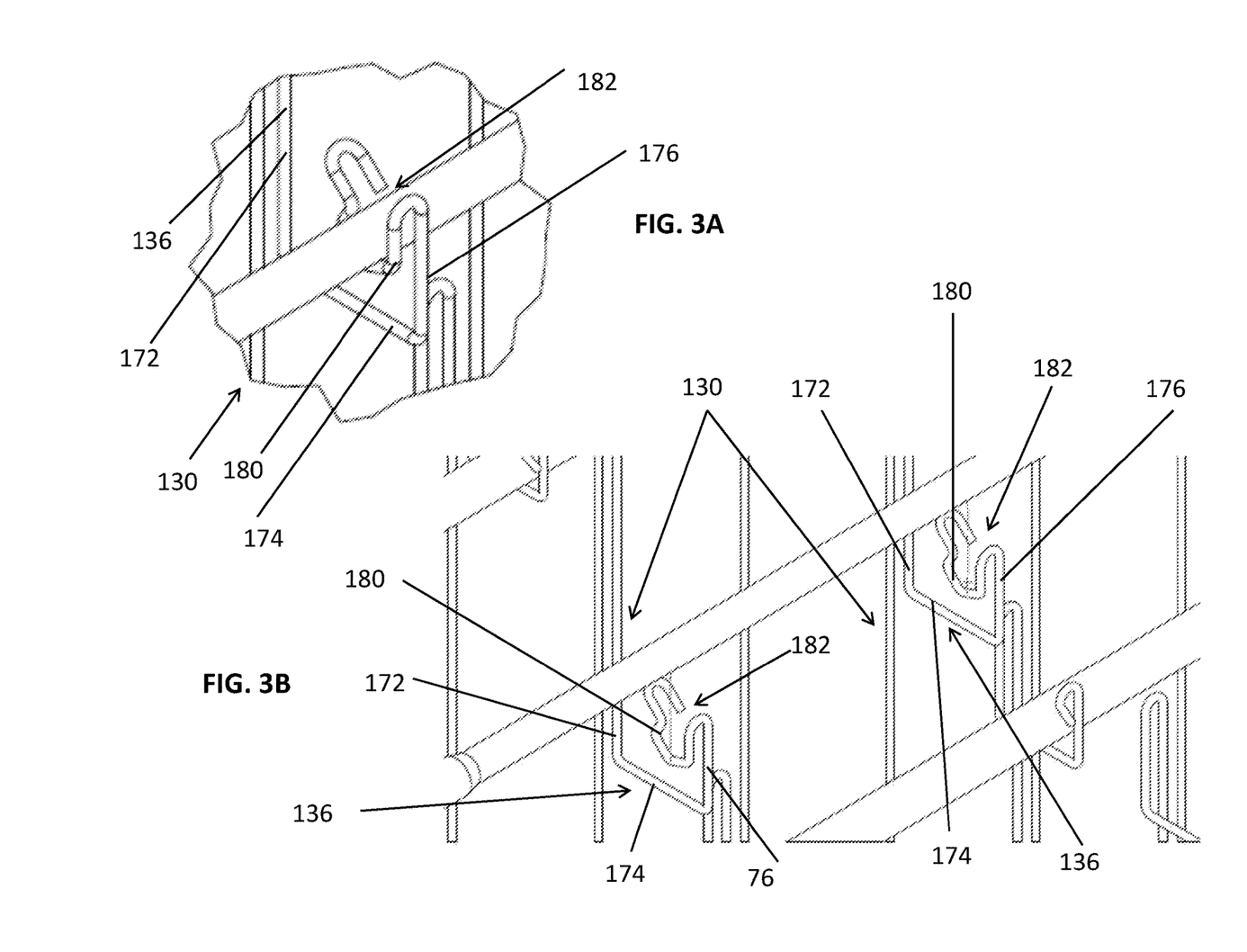
FIG. 3A is an enlarged, perspective view of the area of detail indicated as "3A" in FIG. 1.
FIG. 3B is an enlarged, perspective, partially-exploded view of a portion of the cable support system of FIG. 1 including the portion illustrated in FIG. 3A.

Turning to FIGS. 3A and 3B, in conjunction with FIG. 1, as noted above, third segment 136 of each second vertical support 130 extends from the corresponding second segment 134 thereof. The third segment includes a vertically-extending portion 172 (a portion of which forms a side of a partial rectangle), a bottom portion 174 extending perpendicularly relative to a plane containing upper and lower horizontal supports 110, 120 and forming a bottom of the partial rectangle, and a second vertically-extending portion 176 forming an opposing side of the partial rectangle. In this manner, a cable receiving area is defined, similarly as detailed above. Plural third segments 136 cooperate to define a horizontally-extending a cable-receiving channel extending along cable support apparatus 100, similarly as detailed above. This cable-receiving channel is vertically offset from the other cable-receiving channels so as not to intersect or otherwise interfere therewith.

Extending from second vertically-extending portion 176 of third segment 136, at least partially into the cable receiving area and thereabove, is a cable-capture arm 180. Cable-capture arm 180 is a continuation of the wire stock forming third segment 136 and is bent in a convoluted manner such that a horizontally-oriented, open-topped opening 182 is defined thereby. The opening 182 includes a bottom portion defining a greater width as compared to a mouth thereof such that a portion of cable-capture arm 180 is resiliently flexed to widen the mouth for receipt of a cable and/or other appliances such as linear tubular lighting fixtures and then resiliently returns (at least partially back towards its at-rest position) to retain the cable within the opening 182. In other configurations and/or depending upon the diameter of the cable, flexion of the cable-capture arm 180 is not required.

The cable-capture arms 180 of plural first vertical supports 130 cooperate to define a cable-retention pathway extending horizontally along cable support apparatus 100. This pathway is vertically offset from the other cable-receiving channels and paths so as not to intersect or otherwise interfere therewith.

Figures 4A, 4B:
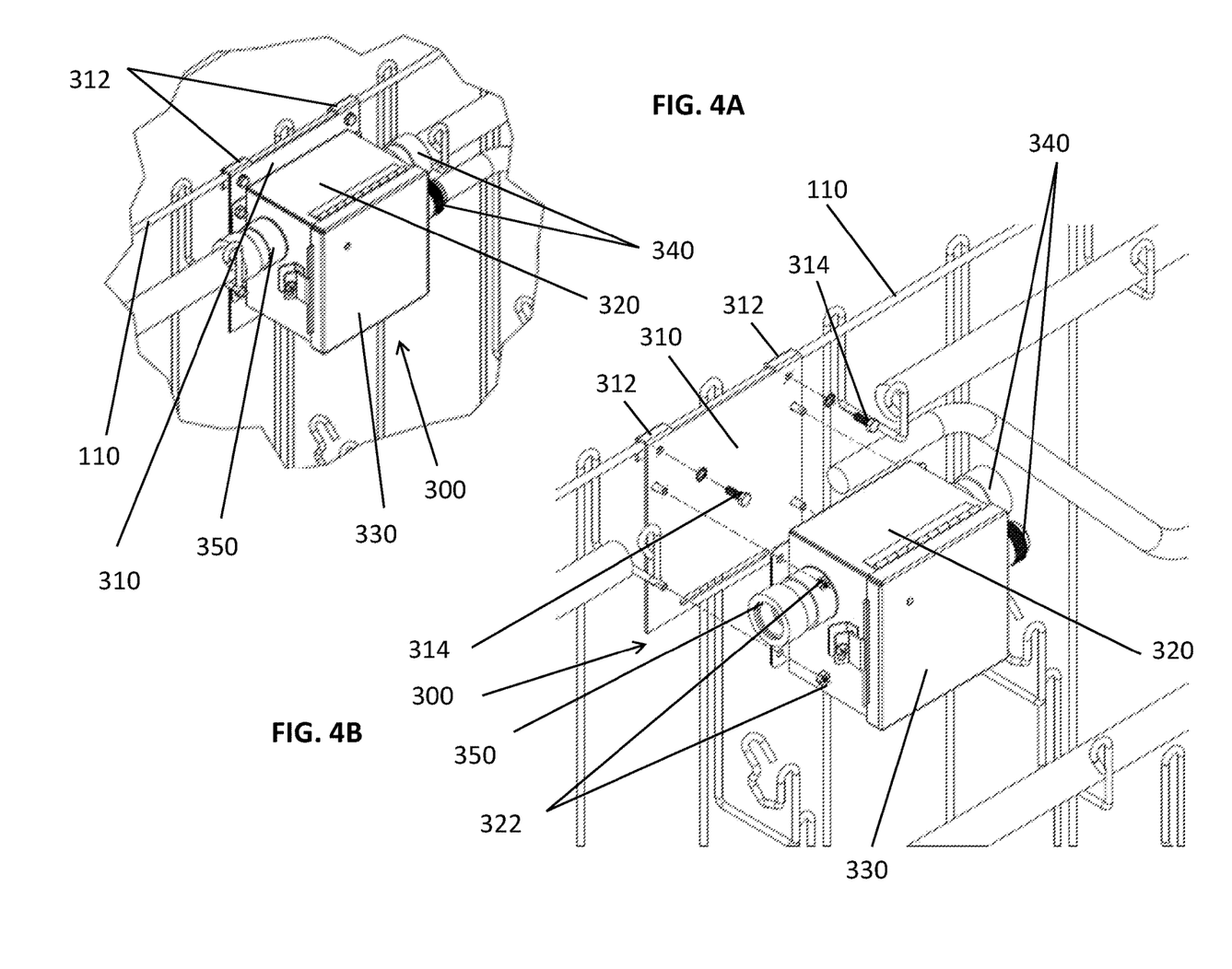
FIG. 4A is an enlarged, perspective view of the area of detail indicated as "4A" in FIG. 1.
FIG. 4B is an enlarged, perspective, partially-exploded view of a portion of the cable support system of FIG. 1 including the portion illustrated in FIG. 4A.

Referring to FIGS. 4A and 4B, as mentioned above, one or more junction box assemblies 300 are modularly attached to cable support apparatus 100. Junction box assembly 300 includes a back plate 310, a box housing 320 including a hinged door 330, at least one input 340 into box housing 320, and at least one output 350 from box housing 320.

Back plate 310 includes two or more hooks 312 such as, for example, to enable back plate 310 to be hung from upper horizontal support 110. Fasteners 314, e.g., screws, bolts, etc., inserted through apertures defined within back plate 310 may be utilized to secure hooks 312 about upper horizontal support 110, e.g., to inhibit removal of back plate 310 after hanging on upper horizontal support 110.

Box housing 320 is configured to engage back plate 310, e.g., via a plurality of fasteners 322 such as, for example, screws, bolts, etc. With box housing 320 engaged on back plate 310, the one or more inputs 340 and one or more outputs 350 are oriented in generally horizontal directions while the hinged door 330 faces outwardly from the plane including upper and lower horizontal supports 110, 120. In this manner, hinged door 330 can be readily manipulated to access the interior of box housing 320.

The one or more inputs 340 are configured to receive the ends of one or more cables or cable-carrying conduits. Likewise, the outputs 350 are configured to receive the ends of one of one or more cables or cable-carrying conduits. Within box housing 320, the ends of the various cables may be spliced, coupled, connected, or otherwise joined as required. Monitoring electronics, switches, or other components may likewise be installed within box housing 320, connected to the cables. Thus, where various cables (or conduits) and/or cable (or conduit) sets are carried over large distances and require joining, and/or with cables (or conduits) from various different peripheral devices feeding in at different locations and requiring joining, any suitable number of junction box assemblies 300 may be utilized and incorporated into the cable support apparatus 100.

At least one input 340 and at least one output 350 of junction box assembly 300, when hung on upper horizontal support 110, may be configured to be in-line with one of the cable-receiving channels of cable support apparatus to facilitate joining cables extending therealong.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A cable support apparatus, comprising:
   first and second horizontal supports spaced-apart and substantially parallel to one another, each horizontal support formed from wire stock; and
   a plurality of vertical supports spaced-apart horizontally along the first and second horizontal supports, each vertical support formed from wire stock and secured to each of the first and second horizontal supports, at least two of the vertical supports including cable-receiving segments that cooperate to define at least one cable-receiving channel extending horizontally; and
   at least one junction box assembly configured to hang from the first horizontal support, the at least one junction box assembly including an input and an output for receiving cable ends of cables disposed within one of the at least one cable-receiving channels to enable joining of the cable ends within the junction box assembly.

2. The cable support apparatus according to claim 1, wherein the vertical supports are secured to the first and second horizontal supports via welding.

3. The cable support apparatus according to claim 1, wherein the cable-receiving segments of the at least two of the vertical supports define rectangular-shaped cable-receiving areas extending perpendicularly relative to a plane containing the first and second horizontal supports.

4. The cable support apparatus according to claim 1, wherein a plurality of cable-receiving channels extend horizontally, the plurality of cable-receiving channels vertically offset relative to one another.

5. The cable support apparatus according to claim 1, wherein at least two of the vertical supports further include cable-grasping segments configured to defining a cable-grasping channel extending horizontally.

6. The cable support apparatus according to claim 1, wherein each of the vertical supports cooperates with each of the first and second horizontal supports to define first and second enclosed openings that enabling mounting of the cable support apparatus.

7. The cable support apparatus according to claim 1, wherein at least one of the vertical supports defines a coupling arrangement configured to releasably secure a modular attachment thereto.

8. The cable support apparatus according to claim 7, wherein the modular attachment is a conduit support including an enclosed ring.

9. The cable support apparatus according to claim 1, wherein at least two of the vertical supports are different from one another.

10. The cable support apparatus according to claim 9, wherein a first plurality of the vertical supports and a second plurality of the vertical supports are different from one another.

11. The cable support apparatus according to claim 10, wherein the at least one cable receiving channel includes first and second cable receiving channels formed by cooperation of respective cable receiving segments of the first and second pluralities of the vertical supports wherein the first and second cable receiving channels are vertically offset from each other.

12. The cable support apparatus according to claim 11, further comprising a third plurality of the vertical supports different from the first and second pluralities, wherein the cable receiving segments of the third plurality of the vertical supports cooperate to define a third cable-receiving channel vertically offset from the first and second cable-receiving channels.

13. The cable support apparatus according to claim 1, wherein the junction box assembly includes:
   a plate configured to hang from the first horizontal support;
   a housing supported by the plate, wherein the input and the output are provided to the housing; and
   a hinged door selectively providing access to an interior of the housing.

14. The cable support apparatus according to claim 13, wherein the junction box assembly further includes a second input.

\* \* \* \* \*